US008638897B2

(12) United States Patent
Aoike et al.

(10) Patent No.: US 8,638,897 B2
(45) Date of Patent: Jan. 28, 2014

(54) UNDERWATER REMOTE SURFACE INSPECTION METHOD AND APPARATUS FOR REACTOR CONSTITUTING MEMBER

(75) Inventors: Satoru Aoike, Tokai (JP); Masaaki Tanaka, Hitachi (JP); Koichi Kurosawa, Hitachi (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 1057 days.

(21) Appl. No.: 12/579,238

(22) Filed: Oct. 14, 2009

(65) Prior Publication Data

US 2010/0089164 A1    Apr. 15, 2010

(30) Foreign Application Priority Data

Oct. 15, 2008 (JP) ................................ 2008-266074

(51) Int. Cl.
*G21C 17/00* (2006.01)

(52) U.S. Cl.
USPC .......................................... 376/249; 376/245

(58) Field of Classification Search
USPC ..................... 376/245, 249–252, 260, 277
See application file for complete search history.

(56) References Cited

FOREIGN PATENT DOCUMENTS

| EP | 1752280 | | 2/2007 | | |
|---|---|---|---|---|---|
| EP | 1759824 | | 3/2007 | | |
| EP | 1932647 | | 6/2008 | | |
| EP | 1932647 | A2 * | 6/2008 | ............... | B29C 39/02 |
| JP | 58203032 | | 11/1983 | | |
| JP | 58203032 | A * | 11/1983 | ............... | B29H 3/00 |
| JP | 252144 | | 4/1990 | | |
| JP | 03081639 | | 4/1991 | | |
| JP | 10192802 | | 7/1998 | | |
| JP | 10192802 | A * | 7/1998 | ............... | B08B 3/12 |
| JP | 10227727 | | 8/1998 | | |
| JP | 2002257697 | | 9/2002 | | |
| JP | 2002257697 | A * | 9/2002 | ............... | G01N 1/28 |
| JP | 2003-262695 | | 9/2003 | | |
| JP | 2003255074 | | 9/2003 | | |
| JP | 2003262695 | A * | 9/2003 | ............. | G21C 19/02 |

(Continued)

OTHER PUBLICATIONS

Partial European search report dated Oct. 11, 2011 for corresponding European Patent Application No. EP 09-01-2979.

(Continued)

*Primary Examiner* — Jack W Keith
*Assistant Examiner* — Marshall O'Connor
(74) *Attorney, Agent, or Firm* — Brundidge & Stanger, P.C.

(57) ABSTRACT

In an underwater remote surface inspection method for a reactor constituting member, in order to improve the precision of an operation of inspecting a surface shape of the reactor constituting member, an underwater remote surface inspection apparatus includes a replica picking head, an ultrasonic vibrator, and a replica agent cartridge. The replica picking head is pressed against a surface of core internal structure as an inspection target. A replica agent is supplied from the replica agent cartridge into the replica agent supply region formed inside the replica picking head and contacting with the surface of the core internal structure. After the operation of supplying the replica agent ends, an ultrasonic wave is transmitted from an ultrasonic vibrator to the replica agent inside the replica agent supply region. Accordingly, gas bubbles or liquid bubbles existing inside the replica agent supply region rise up so as to be discharged to the outside of the replica picking head through an air extracting hole. As a result, the gas bubbles or the liquid bubbles do not remain in the surface of the replica agent contacting with the surface of the core internal structure.

3 Claims, 7 Drawing Sheets

(56) References Cited

FOREIGN PATENT DOCUMENTS

| | | |
|---|---|---|
| JP | 2004-184356 | 7/2004 |
| JP | 2005089852 | 4/2005 |
| JP | 2005-351733 | 12/2005 |
| JP | 3890239 | 12/2006 |
| JP | 3921573 | 3/2007 |

OTHER PUBLICATIONS

Notification of Reasons for Rejection mailed Jun. 26, 2012 in corresponding Japanese Patent Application No. 2008-266074 with English language translation.

* cited by examiner

UNDERWATER REMOTE SURFACE INSPECTION METHOD AND APPARATUS FOR REACTOR CONSTITUTING MEMBER

FIELD OF THE INVENTION

The present invention relates to an underwater remote surface inspection method and apparatus for a reactor constituting member, and particularly, to an underwater remote surface inspection method and apparatus for a reactor constituting member which are suitable for inspecting a surface shape of a reactor constituting member of a boiling water reactor.

DESCRIPTION OF RELATED ART

With respect to a reactor constituting member such as a reactor core internal structure installed inside a reactor pressure vessel of a nuclear power plant, various methods have been proposed for inspecting a surface state of the reactor constituting member. As a typical surface state inspection method, there is known a method which inspects a surface shape of a reactor constituting member by transferring the surface shape to a replica agent (see JP-B2-3921573 and JP-32-3890239).

JP-B2-3921573 discloses a surface state inspection method which picks a replica of a surface of a control rod used in the nuclear power plant. An underwater surface inspection apparatus used in this method has a configuration in which a replica mechanism probe attached to a driving unit vertically moving along the control rod disposed under the water is fixed to the control rod while being pressed thereto.

JP-B2-3890239 discloses an underwater remote surface inspection apparatus. The underwater remote surface inspection apparatus has a configuration in which a medical fluid is supplied into a seal chamber coming into press contact with an inspection target surface as a surface of a reactor core internal structure so as to perform etching on the inspection target surface and a replica agent is supplied into the seal chamber so as to pick a replica of the inspection target surface.

JP-A-2005-351733 discloses a method which nondestructively inspects a defect of a mechanical component or the like. This method includes the steps of: applying a solvent to an inspection region of a surface of an inspection target so as to attach a replica film to the inspection region; applying ultrasonic vibration to the attached replica film; and detaching the replica film from the inspection target. When the ultrasonic vibration is applied to the attached replica film, the replica film melted by the action of the solvent easily infiltrates the deepest portion of a defect existing in the inspection region.

In the underwater remote surface inspection apparatus using the replica agent, when gas bubbles or liquid bubbles remain between the replica agent and the surface of the inspection target upon picking the replica having the surface shape of the core internal structure after supplying the replica agent into a chamber pressed against the surface of the core internal structure, a part of the surface shape of the core internal structure may not be transferred to the replica. Since unevenness in a surface of a welded portion and a machined surface of the inspection target is large, gas bubbles or liquid bubbles easily remain between the replica agent and the surface of the inspection target. As a result, the precision in the operation of inspecting the machined surface and the welded portion, which are frequently required to be inspected in the surface shape of the core internal structure, deteriorates.

SUMMARY OF THE INVENTION

An object of the invention is to provide an underwater remote surface inspection method and apparatus for a reactor constituting member capable of improving the precision in an operation of inspecting a surface shape of a reactor constituting member.

In order to achieve the above-described object, the invention is characterized in that a replica picking head having a replica agent supply region provided with an opening is pressed against a surface of a reactor constituting member in the state where the opening faces the surface of the reactor constituting member disposed in a reactor vessel, a replica agent is supplied to the replica agent supply region inside the pressed replica picking head so that the replica agent contacts with the surface of the reactor constituting member, and then an ultrasonic wave is applied to the replica agent inside the replica picking head.

When the ultrasonic wave is applied to the replica agent filled inside the replica agent supply region, it is possible to remove gas bubbles or liquid bubbles remaining inside the replica agent supply region from the inside of the replica agent supply region. The operation of removing the gas bubbles or the liquid bubbles is performed on the basis of the fact that the eigenfrequency of each of the gas bubbles or the liquid bubbles is different from the eigenfrequency of the replica agent. Since the amount of the gas bubbles or the liquid bubbles remaining in the surface of the reactor constituting member as the inspection target decreases, it is possible to decrease the amount of the gas bubbles or the liquid bubbles remaining in the surface of the hardened replica agent, and to highly precisely transfer the surface shape of the reactor constituting member to the replica agent. Accordingly, it is possible to improve the precision in the operation of inspecting the surface shape of the reactor constituting member by observing the surface image of the reactor constituting member transferred to the surface of the hardened replica agent.

According to the invention, since it is possible to remove the gas bubbles or the liquid bubbles existing between the replica agent and the surface of the inspection target, it is possible to improve the precision in the operation of inspecting the surface shape of the reactor constituting member.

Other objects, features and advantages of the invention will become apparent from the following description of the embodiments of the invention taken in conjunction with the accompanying drawings.

DETAILED DESCRIPTION OF THE INVENTION

Hereinafter, embodiments according to the invention will be described.

First Embodiment

An underwater remote surface inspection apparatus for a reactor constituting member according to a first embodiment as an exemplary embodiment of the invention will be described with reference to FIGS. 1A and 1B.

Figure 1A:
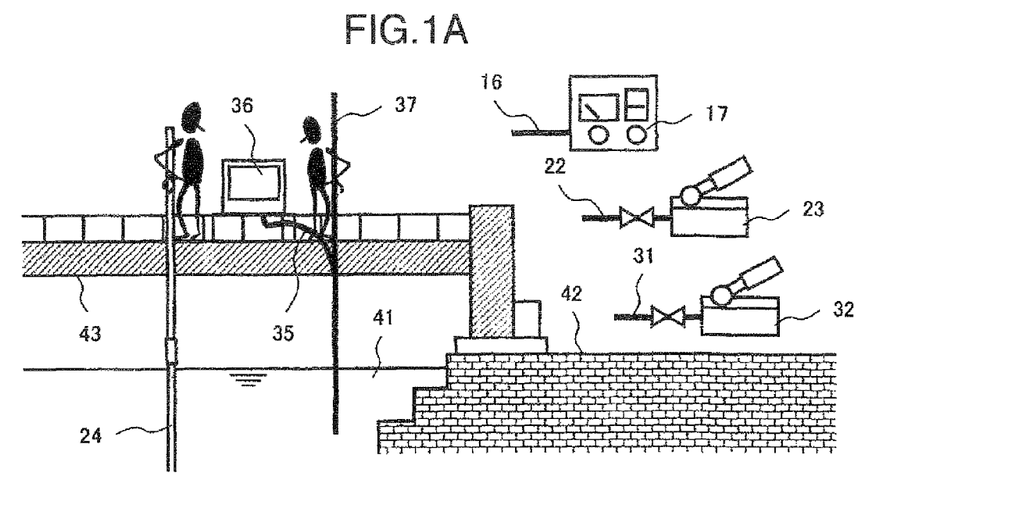
FIGS. 1A and 1B are diagrams illustrating a configuration of an underwater remote surface inspection apparatus for a reactor constituting member according to a first embodiment of the invention.
Figure 1B:
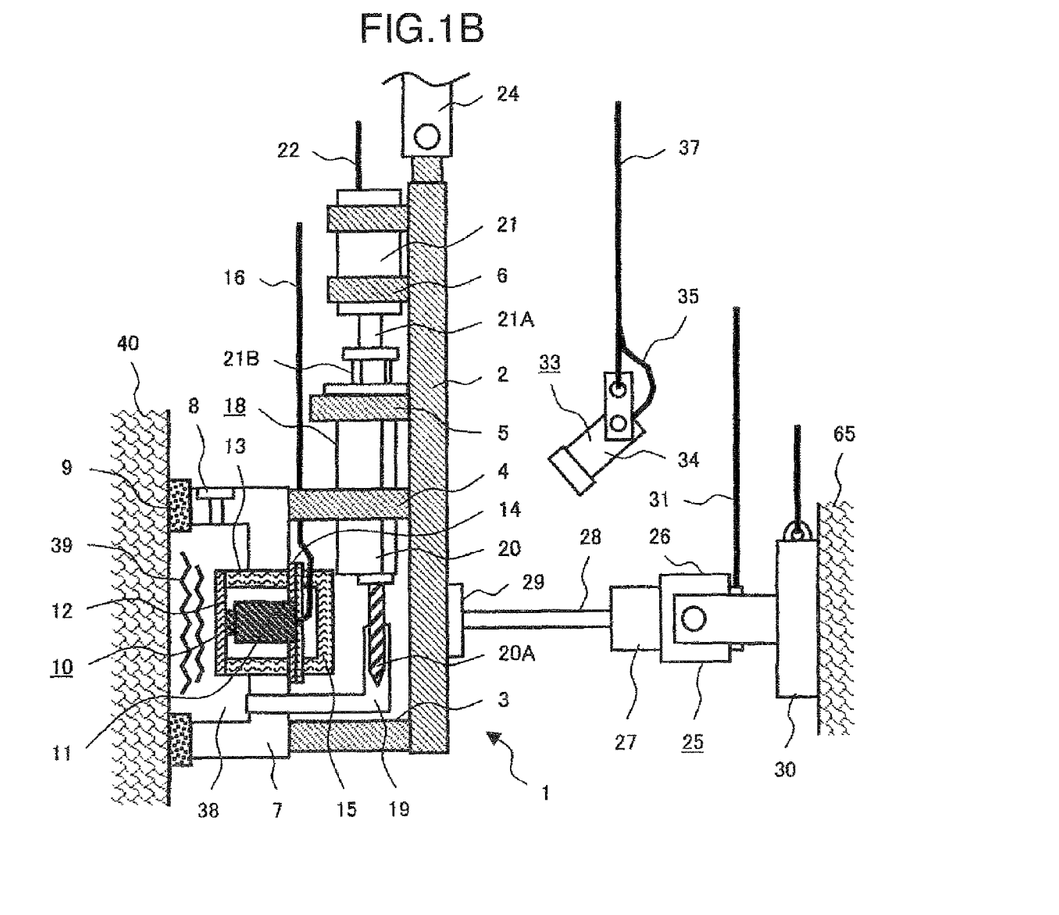

As illustrated in FIG. 1B, an underwater remote surface inspection apparatus 1 according to the embodiment includes a body 2, a replica picking head 7, an ultrasonic vibration unit (ultrasonic transmitting device) 10, and a replica agent supply unit (replica agent supply device) 18. The body 2 is attached to a lower end of a manipulation pole 22. The replica picking head 7 has therein a replica agent supply region 38 corresponding to a chamber and provided with an opening facing core internal structures 40. The replica picking head 7 is attached to the body 2 through support members 3 and 4. An air extracting hole (through hole) 8 is formed in the upper end of the replica picking head 7, and the air extracting hole 8 is formed such that a sectional area of a passageway of the upper portion of the air extracting hole 8 is larger than that of the lower portion thereof.

The ultrasonic vibration unit 10 includes an ultrasonic vibrator 11, an ultrasonic vibration plate 12, a cylindrical housing member 13, and an ultrasonic transmitter (ultrasonic transmitting device) 17 of FIG. 1A. The housing member 13 is attached to the replica picking head 7 so as to penetrate the replica picking head 7, and the ultrasonic vibration plate 12 is disposed inside the replica agent supply region 38. The ultrasonic vibration plate 12 disposed inside the replica agent supply region 38 faces the replica agent supply region 38, and is water-tightly attached to the housing member 13 by entire circumferential welding or the like. The ultrasonic vibrator 11 is disposed inside the housing member 13 so as to be attached to the housing member 13. A water-resistant cover 15 is attached to the housing member 13 by a flange 14 so as to prevent water from entering the housing member 13. The ultrasonic vibration plate 12, the housing member 13, and the water-resistant cover 15 constitute a casing having a sealing structure of surrounding the ultrasonic vibrator 11. A cable 16 connected to the ultrasonic vibrator 11 is connected to the ultrasonic transmitter 17 through the water-resistant cover 15.

The replica agent supply unit 18 includes a replica agent supply pipe 19, a replica agent cartridge 20, a water-pressure cylinder 21, and a hand pump 23. The replica agent supply pipe 19 is attached to the replica picking head 7 so as to be opened to the lower portion of the replica agent supply region 38. The replica agent cartridge 20 is separably attached to the support member 5 attached to the body 2. A replica agent discharge pipe 20A disposed in the replica agent cartridge 20 is separably connected to the replica agent supply pipe 19. The water-pressure cylinder 21 is installed in the body 2 through a support member 6. A piston (not illustrated) is disposed inside the water-pressure cylinder 21, and a rod 21A connected to the piston is connected to a pressing member 21B for pressing the replica agent cartridge 20. A high-pressure hose 22 connected to the water-pressure cylinder 21 is connected to the hand pump 23.

At the time when the surface of the inspection target existing under water is remotely inspected by the underwater remote surface inspection apparatus 1, a monitor device 33 and a fixing device 25 are used as assisting devices.

The monitor device 33 includes an underwater camera (photographing device) 34 and a television monitor 36. The underwater camera 34 is attached to the manipulation pole 37. A cable 35 connected to the underwater camera 34 is connected to the television monitor 36.

The fixing device 25 includes a water-pressure cylinder 26, a piston 27, a rod 28, and pressing members 29 and 30. The piston 27 is inserted into the water-pressure cylinder 26. The pressing member 29 is attached to the front end of the rod 28 attached to one end of the piston 27. The pressing member 30 is rotatably attached to the cylinder 25. The high-pressure hose 31 is connected to the water-pressure cylinder 26 and the hand pump 32.

An underwater remote surface inspection method for a reactor constituting member which is performed on a boiling water reactor by using the underwater remote surface inspection apparatus 1 will be described in detail with reference to FIG. 2. The underwater remote surface inspection for the reactor constituting member is performed during a periodic inspection performed after stopping the operation of the boiling water reactor. After the operation of the boiling water reactor stops, a lid of a reactor containment vessel surrounding a reactor pressure vessel is removed, and cooling water is filled into a reactor well 41 located above the reactor pressure vessel. In this state, a lid of the reactor pressure vessel is removed. Subsequently, a steam dryer, a steam-water separator, and a shroud head installed inside the reactor pressure vessel are removed and are delivered to the outside of the reactor pressure vessel. All fuel assemblies loaded on a reactor core are extracted by using a fuel exchanger 43. The fuel assemblies extracted from the reactor core are transported in the inside of a reactor building having the reactor containment vessel into a fuel storage pool disposed above the reactor containment vessel by using the fuel exchanger 43. After all fuel assemblies are extracted from the reactor core, the underwater remote surface inspection for the reactor constituting member is performed. The ultrasonic transmitter 17 and the hand pumps 23 and 32 of the underwater remote surface inspection apparatus 1 are disposed on an operation floor 42. The television monitor 36 is disposed on, for example, the fuel exchanger 43.

The underwater remote surface inspection apparatus is moved to an inspection region of the reactor constituting member as the inspection target (Step S1). At the time when the underwater remote surface inspection is performed, the manipulation pole 24 is attached to the body 2 of the underwater remote inspection apparatus 1 by an operator. The operator riding in the fuel exchanger 43 inserts the underwater camera 34 from the reactor well 41 into the reactor pressure vessel by using the manipulation pole 37 attached with the underwater camera 34. The other operator riding in the fuel exchanger 43 moves the underwater remote surface inspection apparatus 1 from the reactor well 41 into the reactor pressure vessel by using the manipulation pole 24 attached to the body 2 of the underwater remote surface inspection apparatus 1. The image information on the underwater remote surface inspection apparatus 1 and the periphery thereof inside the reactor pressure vessel photographed by the underwater camera 34 is transmitted to the television monitor 36 through the cable 35, and is displayed on the television monitor 36. The operator having the manipulation pole 24 manipulates the manipulation pole 24 while seeing the image displayed on the television monitor 36 so as to move the underwater remote surface inspection apparatus 1 to the inspection region of the reactor constituting member as the inspection target. In this embodiment, the inspection target is the core internal structures 40 as the reactor constituting member (in detail, the reactor core shroud). The reactor core shroud is a cylindrical member which is installed inside the reactor pressure vessel so as to surround the reactor core. In addition, the inspection region is the inner surface of the reactor core shroud. The underwater remote surface inspection apparatus 1 is disposed inside the reactor core shroud.

The ultrasonic vibration unit is made to face the surface of the inspection target (Step S2). The operator adjusts the direction of the underwater remote surface inspection apparatus 1 by manipulating the manipulation pole 24 so that the opening of the replica picking head 7 and the ultrasonic vibration plate 12 face the inner surface of the reactor core shroud. When the opening of the replica picking head 7 and the ultrasonic vibration plate 12 face the inner surface of the reactor core shroud, the manipulation pole 24 is fixed to the fuel exchanger 43 so as to maintain this state. Whether the opening of the replica picking head 7 faces the inner surface of the reactor core shroud can be observed by the image photographed by the underwater camera 34 and displayed on the television monitor 36. The underwater remote surface inspection apparatus 1 is held in the state where a sponge 9 disposed in the opening-side front end of the replica picking head 7 is separated from the inner surface of the reactor core shroud.

Solid materials such as clad materials adhered to the inspection target are removed (Step S3). An excitation signal is output from the ultrasonic transmitter 17 to the ultrasonic vibrator 11. The ultrasonic vibrator 11 as a vibration source starts to be vibrated upon receiving the excitation signal so as to allow the ultrasonic vibration plate 12 to resonate. As a result, an ultrasonic wave 39 is transmitted from the ultrasonic vibration plate 12. The ultrasonic wave 39 is transmitted to the reactor core shroud (core internal structure 40) as the inspection target for a predetermined period of time. The transmitted ultrasonic wave 39 is applied to the surface of the inspection region of the reactor core shroud so as to remove the solid materials such as the clad materials adhered to the surface. At this time, when the frequency of the transmitted ultrasonic wave 39 is modulated by changing the frequency of the excitation signal output from the ultrasonic transmitter 17 to the ultrasonic vibrator 11, it is possible to efficiently remove the solid materials such as the clad materials having different sizes attached to the inspection region of the reactor core shroud. In addition, the period of the transmission of the ultrasonic wave 39 is dependent on the thickness of the clad materials adhered to the surface of the inspection region.

The ultrasonic wave 39 is continuously transmitted until the solid materials such as the clad materials adhered to the inner surface (the surface of the inspection region) of the reactor core shroud are removed so as not to negatively influence a surface transfer using a replica agent. The removed solid materials such as the clad materials drop through a gap between the inner surface of the reactor core shroud and the sponge 9. After the operation of removing the solid materials ends, the transmission of the ultrasonic wave stops.

Since the ultrasonic wave 39 is applied to the inner surface of the reactor core shroud, it is possible to remove the solid materials adhered to the inner surface and the clad materials existing in a crack in the case that the crack is formed in the inner surface.

The replica picking head is pressed against the surface of the inspection target (Step S4). After the solid materials such as the clad materials are removed from the surface of the inspection region of the reactor core shroud, the operator presses the replica picking head 7 against the inner surface of the reactor core shroud by manipulating the manipulation pole 24 while observing the image in the periphery of the underwater remote surface inspection apparatus 1 photographed by the underwater camera 34 through the television monitor 36. The sponge 9 disposed in the front surface of the front end of the replica picking head 7 comes into contact with the inner surface of the reactor core shroud. Accordingly, the opening of the replica agent supply region 38 formed inside the replica picking head 7 is blocked by the inner surface of the reactor core shroud, and the replica agent supply region 38 becomes a closed region. In this state, the replica picking head 7 is fixed by fixing the manipulation pole 24 to the fuel exchanger 43 or using the fixing device 25.

The fixing device 25 is delivered into the reactor core shroud through one square portion formed in an upper lattice plate by the manipulation pole (not illustrated) of the operator. The high-pressure water pressurized by the hand pump 32 is supplied to the water-pressure cylinder 26 through the high-pressure hose 31. When the high-pressure water is supplied, a part of the piston 27 is pressed out from the water-pressure cylinder 26 so as to move the rod 28 toward the rear surface of the body 2 of the underwater remote surface inspection apparatus 1. Accordingly, the pressing member 29 disposed in the front end of the rod 28 comes into contact with the rear surface of the body 2. The pressing member 30 of the fixing device 25 comes into contact with a pillar 65 of which an upper end is fixed to the upper lattice plate and a lower end is fixed to the reactor core support plate. When the pressing member 29 presses the body 2, the sponge 9 disposed in the opening-side front end of the replica picking head 7 is pressed against the inner surface of the reactor core shroud. The underwater remote surface inspection apparatus 1 is held while being pressed against the reactor core shroud by the fixing device 25.

The replica agent is supplied into the replica picking head (Step S5). The replica agent is supplied to the replica agent supply region 38 inside the replica picking head 7 pressed against the inner surface of the reactor core shroud with the sponge 9 interposed therebetween. When the hand pump 23 is manipulated, the high-pressure water is supplied into the water-pressure cylinder 21 through the high-pressure hose 22. By means of the action of the high-pressure water, the piston inside the water-pressure cylinder 21 moves down so that the pressing member 21B disposed in the rod 21A presses the replica agent cartridge 20. As a result, the replica agent inside the replica agent cartridge 20 is supplied to the lower portion of the replica agent supply region 38 inside the replica picking head 7 through the replica agent discharge pipe 20A and the replica agent supply pipe 19. The sponge 9 coming into contact with the inner surface of the reactor core shroud prevents the replica agent supplied to the replica agent supply region 38 from leaking to the outside of the replica picking head 7 and serves as a buffer for preventing the inner surface of the reactor core shroud from being damaged by the contact with the front end of the replica picking head 7. The replica agent is injected to the lower portion of the replica agent supply region 38, and a liquid level thereof increases to the upper portion thereof. In accordance with an increase in the liquid level, water and gas bubbles existing in the replica agent supply region 38 are discharged to the outside of the replica picking head 7 through the air extracting hole 8. The amount of the replica agent supplied into the replica agent supply region 38 is set to be equal to the volume of the replica agent supply region 38.

The operation of supplying the replica agent to the replica agent supply region 38 is continuously performed until the replica agent rises inside the air extracting hole 8. During a time when the replica agent is supplied, the air extracting hole 8 is photographed by the underwater camera 34, and the image is displayed on the television monitor 36. When the image illustrating the replica agent rising inside the air extracting hole 8 is displayed on the television monitor 36, the operation of supplying the high-pressure water from the hand pump 23 to the water-pressure cylinder 21 stops. The operation of supplying the replica agent from the replica agent cartridge 20 to the replica agent supply region 38 stops. In addition, it is possible to supply a predetermined amount of replica agent to the replica agent supply region 38 in such a manner that the replica agent having the same volume as that of the replica agent supply region 38 is filled into the replica agent cartridge 20 in advance.

The ultrasonic wave is transmitted from the ultrasonic vibrator to the replica agent (Step S6). After stopping the operation of supplying the replica agent to the replica agent supply region 38, in the same manner as Step S3, the ultrasonic vibrator 11 receiving the excitation signal starts to be vibrated so as to vibrate the ultrasonic vibration plate 12. Accordingly, the ultrasonic wave 39 is transmitted from the ultrasonic vibration plate 12 to the replica agent inside the replica agent supply region 38. When the ultrasonic wave 39 is transmitted to the replica agent filled in the replica agent supply region 38, the replica agent inside the replica agent supply region 38 is vibrated so as to vibrate gas bubbles and liquid bubbles remaining between the replica agent and the inner surface of the reactor core shroud. Since the eigenfrequency of each of the gas bubbles and the liquid bubbles is different from the eigenfrequency of the replica agent, the gas bubbles and the liquid bubbles move into the replica agent filled inside the replica agent supply region 38 so as to be removed from the region where the replica agent contacts with the inner surface of the reactor core shroud. In addition, the gas bubbles and the liquid bubbles moving into the replica agent move up in the inside of the replica agent so as to be discharged to the outside of the replica agent supply region 38, that is, the outside of the replica picking head 7 through the air extracting hole 8. When the ultrasonic wave 39 is applied to the replica agent, it is possible to remove the gas bubbles contained in the replica agent.

The operation of transmitting the ultrasonic wave 39 to the replica agent is continuously performed for a predetermined period of time during which the gas bubbles or the liquid bubbles remaining on the surface of the reactor core shroud as the inspection target are removed. As described above, when the frequency of the transmitted ultrasonic wave 39 is modulated, it is possible to efficiently remove the gas bubbles having different sizes contained in the replica agent. In addition, the operation of transmitting the ultrasonic wave 39 to the replica agent promptly starts after the replica agent is filled into the replica agent supply region 38, and is continuously performed for an appropriate time determined in consideration of a hardening time of the replica agent and the unevenness state on the surface of the inspection target. In addition, in the case where the temperature of the cooling water inside the reactor pressure vessel is high and the time required for the transmission of the ultrasonic wave is not sufficiently ensured, the replica agent having a long hardening time is used as the replica agent supplied into the replica agent supply region 38.

A predetermined time is spent until the replica agent inside the replica agent supply region 38 is hardened (Step S7). The hardening time of the replica agent changes in accordance with the specification of the replica agent to be used and the temperature of the cooling water existing in the periphery of the replica picking head 7. For this reason, a sufficient hardening time for the replica agent inside the replica agent supply region 38 is spent in the state where the replica picking head 7 is pressed against the inner surface of the reactor core shroud.

The hardened replica agent is collected (Step S8). The high-pressure water is supplied to the water-pressure cylinder 26 by manipulating the hand pump 32 so that the piston 27 moves in a direction separating from the body 2. Accordingly, the pressing force acting on the replica picking head 7 by the fixing device 25 is released. In addition, the manipulation pole 24 fixed to the fuel exchanger 43 is separated therefrom. The operator takes out the body 2, the replica picking head 7, and the like of the underwater remote surface inspection apparatus 1 from the inside of the reactor pressure vessel by using the manipulation pole 24 so that the body 2 is lifted above the liquid level of the cooling water inside the reactor well 41. In this manner, the hardened replica agent is collected from the inside of the reactor pressure vessel. At the time when the replica agent is collected, it is desirable that the underwater remote surface inspection apparatus 1 is lifted up to the operation floor 42 so that the transferred surface of the replica agent does not contact with the core internal structures existing in the periphery thereof while observing the image in the periphery of the underwater remote surface inspection apparatus 1 photographed by the underwater camera 34 by the television monitor 36.

The surface shape of the inspection target transferred to the collected replica agent is observed (Step S9). The hardened replica agent lifted up to the operation floor 42 is separated with the sponge 9 from the replica picking head 7. In the case where it is difficult to separate the hardened replica agent from the replica picking head 7 due to the replica agent hardened in the replica agent supply pipe 19 and the air extracting hole 8, the hardened replica agent is cut at the corresponding portion by a knife or the like, and the hardened replica agent is separated from the replica picking head 7. The operator observes the surface of the replica agent coming into contact with the inner surface of the reactor core shroud, and checks whether there is a defect in the inner surface of the reactor core shroud on the basis of the surface state.

In this embodiment, it is possible to remove the gas bubbles contained in the replica agent in such a manner that the ultrasonic wave 39 is transmitted from the ultrasonic vibration unit 10, that is, the ultrasonic vibrator 11 to the replica agent supplied to the replica agent supply region 38 inside the replica picking head 7 having the opening facing the surface of the inspection region of the inspection target. Accordingly, since the gas bubbles contacting with the surface of the inspection region of the reactor core shroud as the inspection target are removed, the shape of the surface of the inspection region is highly precisely transferred to the surface of the hardened replica agent contacting with the inspection region. In this embodiment, it is possible to improve the precision in the operation of inspecting the surface of the reactor core shroud (inspection target).

In this embodiment, in order to supply the replica agent into the replica picking head 7, the ultrasonic wave 39 transmitted from the ultrasonic vibrator 11 is applied to the inner surface of the reactor core shroud so as to remove the solid materials such as the clad materials adhered to the inner surface of the reactor core shroud, before the replica picking head 7 is pressed against the inner surface of the reactor core shroud as the inspection target. For this reason, instead of the shape of the inner surface of the reactor core shroud to which the solid materials are adhered, it is possible to highly precisely transfer the real shape of the inner surface of the reactor core shroud on which the solid materials is removed to the hardened replica agent. Accordingly, it is possible to further improve the precision in the operation of inspecting the surface of the reactor core shroud.

At the time when the ultrasonic wave 39 is applied to the inner surface of the reactor core shroud, since the replica picking head 7, that is, the sponge 9 disposed in the front end of the replica picking head 7 is allowed to be separated from the inner surface of the reactor core shroud, the solid materials removed from the inner surface of the reactor core shroud are dropped downward, and thus, it is possible to remarkably decrease the amount of the radiated solid materials such as the clad materials entering the replica agent supply region 38 of the replica picking head 7. Accordingly, it is possible to remarkably decrease the amount of the solid materials such as the clad materials existing in the region of the replica agent contacting with the inner surface of the reactor core shroud. As a result, it is possible to highly precisely transfer the shape of the inner surface of the reactor core shroud to the hardened replica agent without the influence of the solid materials such as the clad materials.

In this embodiment, since the air extracting hole 8 is photographed by the underwater camera 34, it is understood that the replica agent is filled in the replica agent supply region 38 of the replica picking head 7 pressed against the inner surface of the reactor core shroud at the time when the image that the replica agent supplied to the replica agent supply region 38 rises inside the air extracting hole 8 is displayed on the television monitor 36. In the air extracting hole 8, the sectional area of the passageway at the upper portion thereof is set to be larger than that at the lower portion. When the replica agent rising inside the air extracting hole 8 arrives at the upper portion having the passageway of a large sectional area, the rising speed of the replica agent becomes slow. Accordingly, it is possible to prevent the replica agent from overflowing from the upper end of the air extracting hole 8.

Since the replica picking head 7 is first positioned to the inner surface of the reactor core shroud by using the manipulation pole 24 and then the replica picking head 7 is pressed against the inner surface of the reactor core shroud by using the fixing device 25, the replica picking head 7 does not move during a time when the replica agent is hardened. Accordingly, it is possible to improve the precision in the operation of transferring the surface shape to the replica agent.

When it is found that the solid materials such as the clad materials are not adhered to the surface of the inspection region upon observing the inspection region of the inner surface of the reactor core shroud by using the underwater camera 34, after the operation in Step S2 ends, the operation in Step S4 may start instead of performing the operation of removing the solid materials such as the clad materials in Step S3.

When it is found that the unevenness on the surface of the inspection region is large and a large amount of the gas bubbles and the liquid bubbles remain during the replica agent injecting operation upon observing the inspection region of the inner surface of the reactor core shroud by using the underwater camera 34, first, the ultrasonic wave 39 is transmitted from the ultrasonic vibration plate 12 to the replica agent supply region 38. During a time when the ultrasonic wave 39 is transmitted, the replica agent is supplied into the replica agent supply region 38. During a time when the replica agent is supplied, the ultrasonic wave is transmitted from the ultrasonic vibration plate 12 to the replica agent supply region 38. Accordingly, it is possible to suppress the gas bubbles or the liquid bubbles from remaining between the replica agent, supplied into the replica supply region 38, and the inner surface of the reactor core shroud. Even after a small amount of the replica agent is supplied into the replica agent supply region 38, when the ultrasonic wave 39 is transmitted to the replica agent supply region 38 during a time when the replica agent is supplied into the replica agent supply region 38, it is possible to obtain the same advantage.

This embodiment may be applied to the reactor constituting members other than the reactor core shroud of the boiling water reactor.

For example, this embodiment may be used to inspect the shape of the inner surface of the nozzle formed in the reactor pressure vessel. In addition, this embodiment may be used to inspect the shape of the inner surface of the nozzle and the shape of the surface of the core internal structure which are the reactor constituting members for the pressurized water reactor.

Second Embodiment

An underwater remote surface inspection apparatus for a reactor constituting member according to a second embodiment as another embodiment of the invention will be described with reference to FIGS. 3 to 6. An underwater remote surface inspection apparatus 1A according to this embodiment has a configuration in which a moving device 55 is installed in the underwater remote surface inspection apparatus 1. The other configurations of the underwater remote surface inspection apparatus 1A are the same as those of the underwater remote surface inspection apparatus 1.

Figure 3:
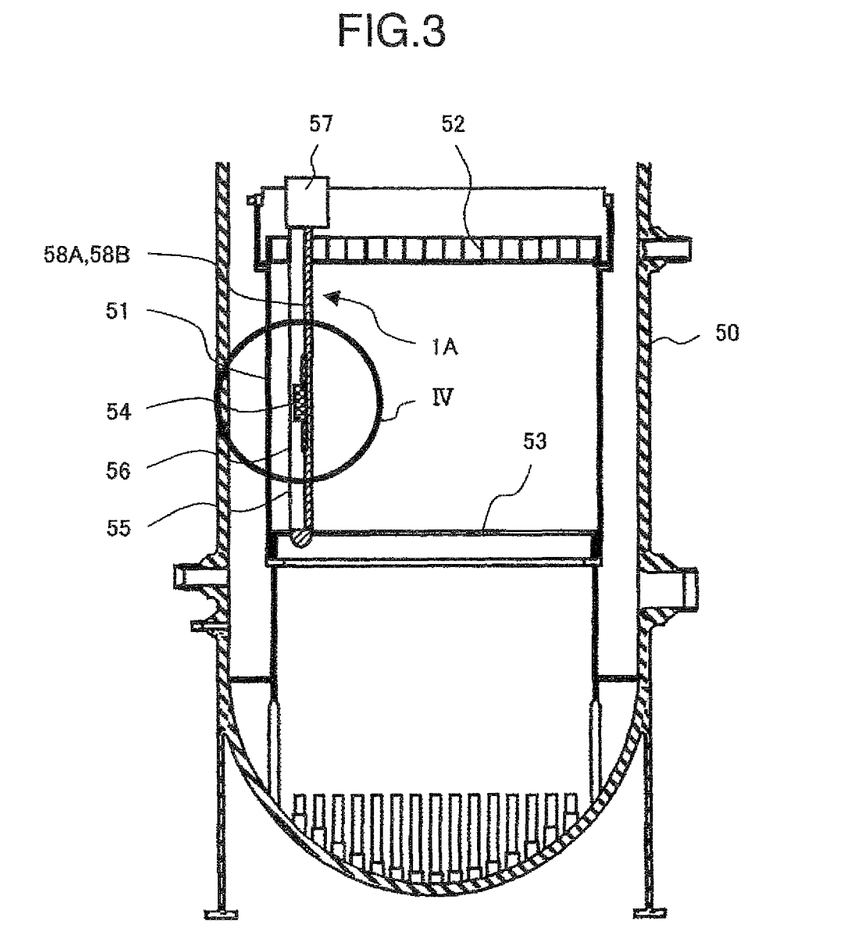
FIG. 3 is an explanatory diagram illustrating a state where an underwater remote surface inspection apparatus for a reactor constituting member according to a second embodiment of the invention is installed inside a reactor pressure vessel of a boiling water reactor.
Figure 4:
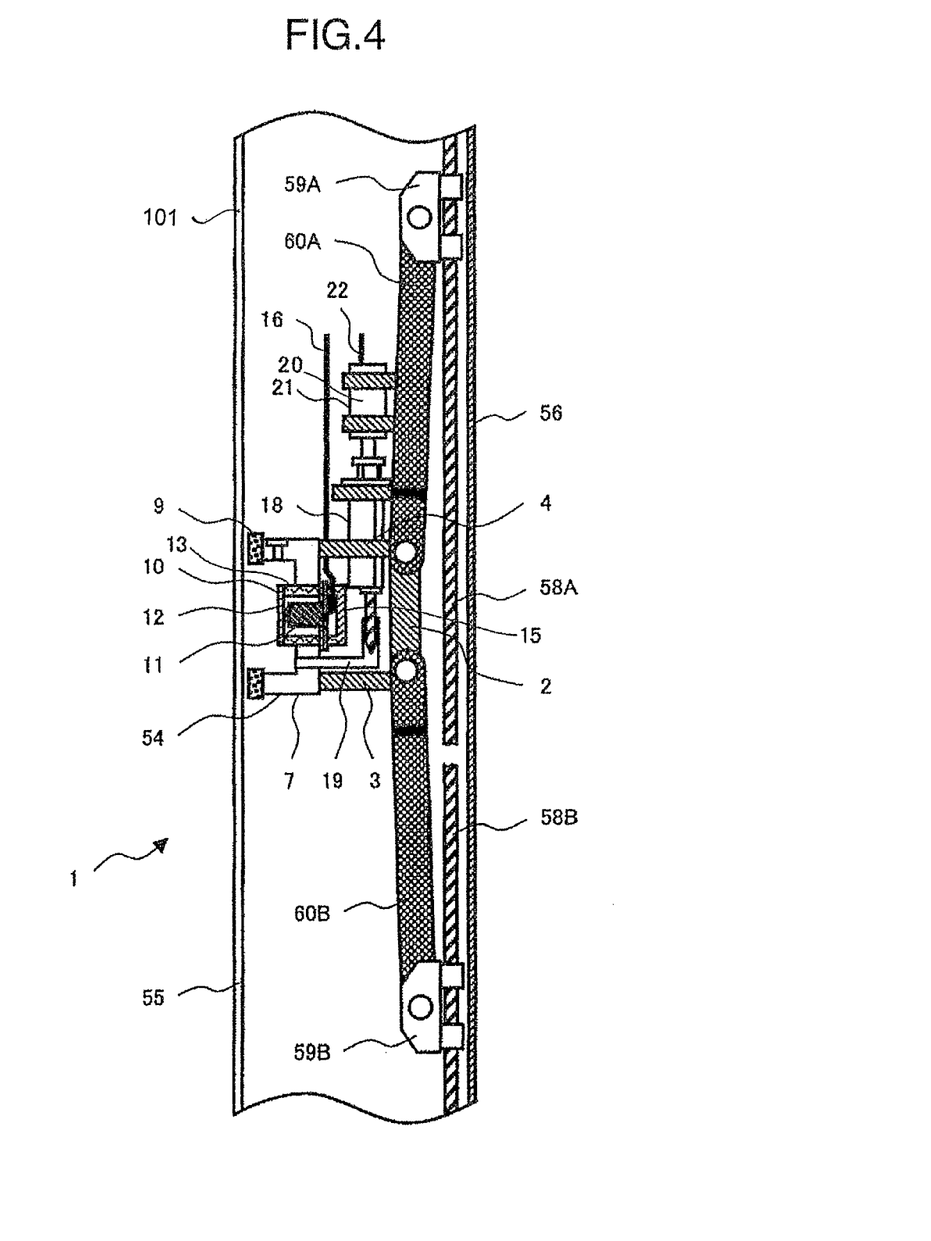
FIG. 4 shows a detailed configuration of the underwater remote surface inspection apparatus for the reactor constituting member according to the second embodiment and is an enlarged view illustrating a part IV in FIG. 3.
Figure 5:
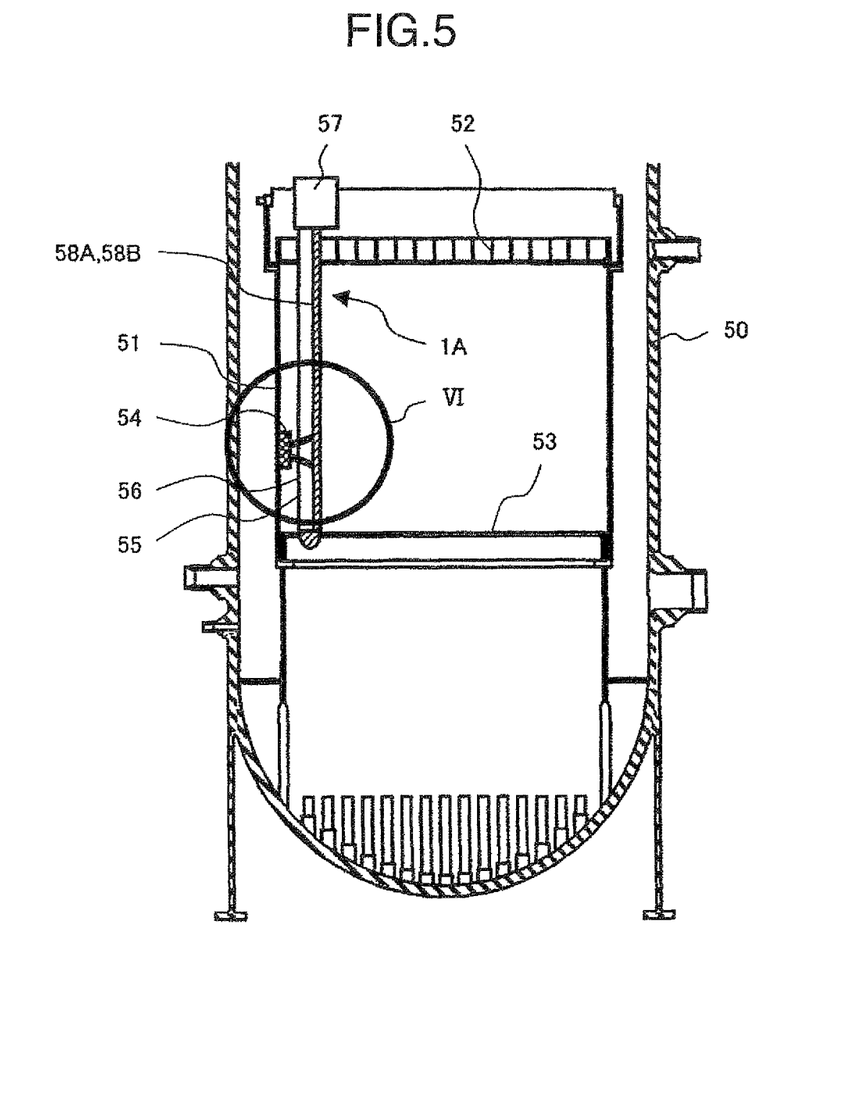
FIG. 5 is an explanatory diagram illustrating a state where a surface inspection device of the underwater remote surface inspection apparatus illustrated in FIG. 4 is pressed against an inner surface of a reactor core shroud as an inspection target inside a reactor pressure vessel.
Figure 6:
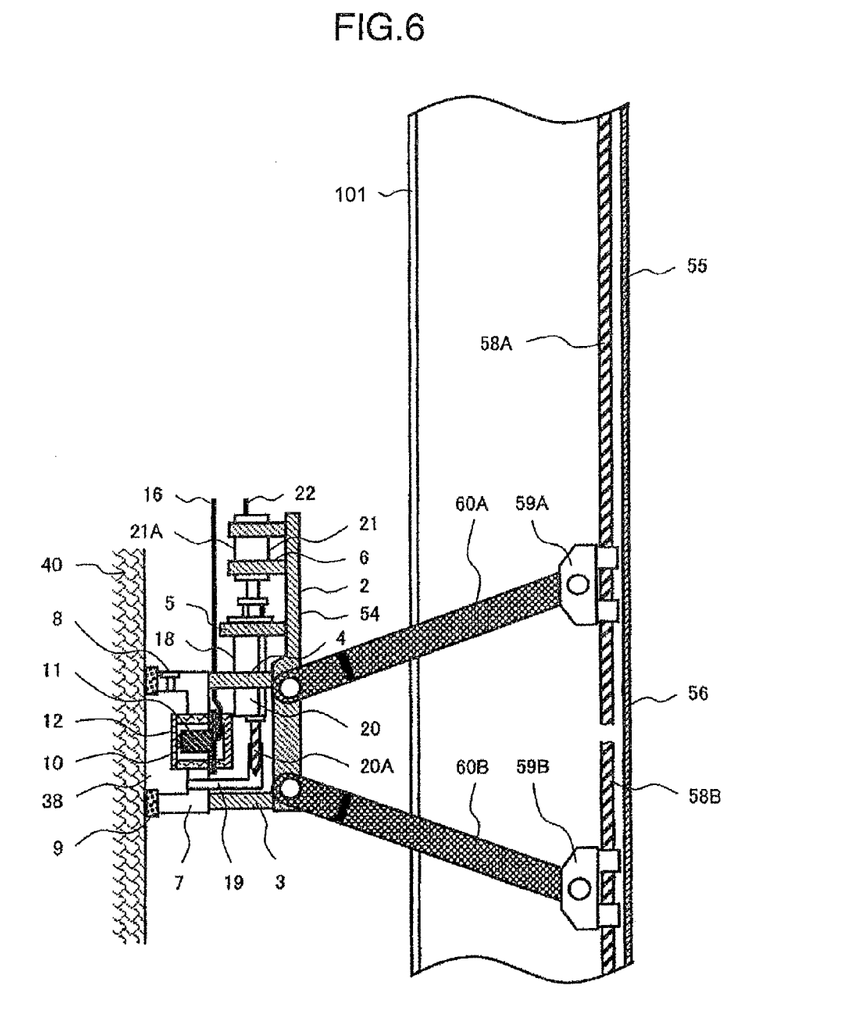
FIG. 6 is an enlarged view illustrating a part VI in FIG. 5.

The moving device 55 includes a longitudinal housing 56, a pair of motors 57, rotation rods 58A and 58B, moving members 59A and 59B, and support arms 60A and 608. The housing 56 is formed in a cylindrical shape and has an opening 101 which is elongated in the axial direction. The housing 56 may be a cylindrical body having a rectangular cross section. The rotation rods 58A and 58B having male screws are disposed in parallel inside the housing 56 so as to extend in the axial direction of the housing 56. The lower ends of the rotation rods 58A and 58B are rotatably attached to the lower end of the housing 56, and the upper ends of the rotation rods 58A and 58B are separately connected to a pair of motors 57 installed in the upper end of the housing 56. The moving members 59A and 59B have perforation holes, provided with female screws, formed in the inner surfaces thereof. The rotation rod 58A is inserted into the perforation hole formed in the moving member 59A, and the male screw formed in the rotation rod 58A meshes with the female screw formed in the perforation hole. The rotation rod 58B is inserted into the perforation hole formed in the moving member 59B, and the male screw formed in the rotation rod 58B meshes with the female screw formed in the perforation hole. The support arm 60A is rotatably attached to the moving member 59A and the body 2. The support arm 60B is rotatably attached to the moving member 592 and the body 2.

The underwater remote surface inspection method for the reactor constituting member performed on the boiling water reactor by using the underwater remote surface inspection apparatus 1A will be described in detail. First, the schematic structure of the boiling water reactor will be described with reference to FIG. 3. The boiling water reactor as a target according to the first embodiment has the configuration illustrated in FIG. 3. In the boiling water reactor, a reactor core shroud 51 is installed inside a reactor pressure vessel 50 so as to surround the reactor core. A reactor core support plate 53 supporting the lower end of the fuel assembly (not illustrated) loaded on the reactor core is installed in the reactor core shroud 51, and an upper lattice plate 52 supporting the upper end of the fuel assembly is installed in the reactor core shroud 51 so as to be located above the reactor core support plate 53.

As described in the first embodiment, the steam dryer, the steam-water separator, and the shroud head are delivered to the outside of the reactor pressure vessel during a periodic inspection after stopping the boiling water reactor. And, all the fuel assemblies loaded on the reactor core are extracted.

Figure 2:
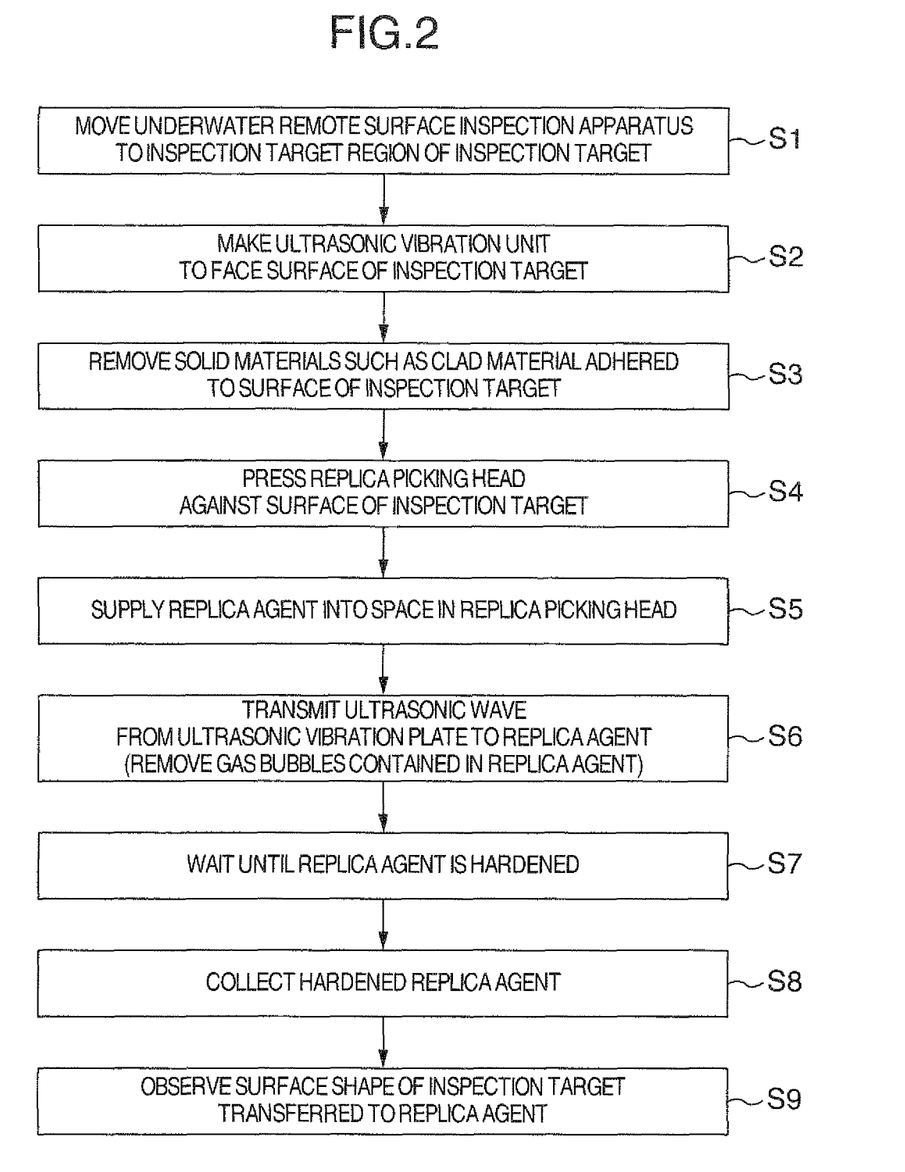
FIG. 2 is a flowchart illustrating processes of an underwater remote surface inspection method for a reactor constituting member by using the underwater remote surface inspection apparatus illustrated in FIG. 1.

Even in the underwater remote surface inspection method for the reactor constituting member according to this embodiment, the processes in Step S1 to Step S9 illustrated in FIG. 2 are performed. Since the underwater remote surface inspection apparatus 1A includes the moving device 55, the detailed operations in Step S1, Step S2, Step S4, and Step S8 illustrated in FIG. 2 are different from those in the first embodiment. The operations of the processes will be mainly described.

The operation of moving the underwater remote surface inspection apparatus 1A in Step S1, that is, the operation of moving the surface inspection device 54 to the inspection region of the reactor core shroud (reactor constituting member) 51 as the inspection target is performed as below.

The underwater remote surface inspection apparatus 1A is gripped by the fuel exchanger 43 (see FIG. 1), and is inserted into one square portion of an upper lattice plate 52, where four fuel assemblies are inserted into one square portion. Subsequently, the underwater remote surface inspection apparatus 1A is lifted down inside the reactor core shroud 51. The lower end of the housing 56 of the underwater remote surface inspection apparatus 1A arrives at the reactor core support plate 53 and is held therein. The one square portion is located in the vicinity of the inner surface of the reactor core shroud 51. The upper end of the housing 56 is held by the upper lattice plate 52. Likewise, the underwater remote surface inspection apparatus 1A is disposed inside the reactor core shroud 51 of the reactor constituting member as the inspection target. The elongate opening formed in the housing 56 faces the inner surface of the reactor core shroud 51. The upper end of the opening is located in the vicinity of the upper lattice plate 52, and the lower end of the opening is located in the vicinity of the reactor core support plate 53.

In addition, when the pair of motors 57 is driven, the rotation rods 58A and 58B are rotated at the same speed in the same direction. The moving member 59A meshing with the rotation rod 58A and the moving member 59B meshing with the rotation rod 58B move toward the lower end of the housing 56 along the rotation rods 58A and 58B at the same speed without changing a gap therebetween. Accordingly, the surface inspection device 54 attached to the support arms 60A and 60B moves down in the inside of the housing 56. When the surface inspection device 54 arrives at the inspection region of the reactor core shroud 51, the operation of driving the pair of motors 57 stops, and the surface inspection device 54 stops so that the opening of the replica picking head 7 faces the inspection region (see FIGS. 3 and 4). The surface inspection device 54 corresponds to the part which is attached to the body 2 of the underwater remote surface inspection apparatus 1 used in the first embodiment. That is, the surface inspection device 54 includes the body 2, the replica picking head 7, the ultrasonic vibrator 11 and the ultrasonic vibration plate 12 of the ultrasonic vibration unit 10, the housing member 13, the water-resistant cover 15, the replica agent supply pipe 19 of the replica agent supply unit 18, the replica agent cartridge 20, and the water-pressure cylinder 21.

The operation of allowing the ultrasonic vibration unit to face the surface of the inspection target in Step S2 is performed as below. In the case where a distance between the inspection region of the inner surface of the reactor core shroud 51 and the ultrasonic vibration plate 12 of the ultrasonic vibration unit 10 is long, it is necessary to move the ultrasonic vibration plate 12 to be close to the inner surface of the reactor core shroud 51 in order to efficiently remove the solid materials such as the clad materials, adhered to the inspection region, by using the ultrasonic wave. This operation will be described in detail with reference to FIGS. 5 and 6. The pair of motors 57 rotates at the same speed in a direction opposite to each other. Accordingly, the rotation rod 58B rotates in a direction opposite to a direction of the rotation rod 58A at the same speed as that of the rotation rod 58A, and hence the moving members 59A and 59B move close to each other so that a gap therebetween becomes narrow. Accordingly, the body 2 moves toward the inner surface of the reactor core shroud 51 in the horizontal direction. The surface inspection device 54 moves toward the inner surface of the reactor core shroud 51 so that a gap between the inner surface and the sponge 9 becomes narrow. When the gap is equal to a predetermined width, the operation of driving the pair of motors 57 stops.

Next, the solid materials such as the clad materials are removed by using the ultrasonic wave in Step S3. Since the sponge 9 is separated from the inner surface of the reactor core shroud 51, the removed solid materials drop to the bottom of the reactor pressure vessel 50.

The operation of pressing the replica picking head 7 against the inner surface of the reactor core shroud 51 in Step S4 is performed as below. In the same manner as Step S2 in this embodiment, the rotation rod 58B rotates in a direction opposite to a direction of the rotation rod 58A at the same speed as that of the rotation rod 58A. The replica picking head 7 moves toward the reactor core shroud 51 farther than the position set in Step S2. The sponge 9 disposed in the front end of the replica picking head 7 contacts with the inner surface of the reactor core shroud 51 so that the replica picking head 7 is pressed against the inner surface of the reactor core shroud 51 by the support arms 60A and 60B.

In the state where the replica picking head 7 is pressed against the inner surface of the reactor core shroud 51, the processes in Step S5, Step S6, and Step S7 are performed. The operation of collecting the replica agent after hardening the replica agent inside the replica supply region 38 of the replica picking head 7 in Step S8 is performed as below. When the motors 57 are driven, the rotation rods 58A and 58B rotate at the same speed in directions opposite to the rotation directions of the rotation rods 58A and 58B in Step S4. When the rotation rods 58A and 58B rotate, a gap between the moving members 59A and 59B becomes wide, and the surface inspection device 54 moves in the horizontal direction so as to be separated from the reactor core shroud 51. In addition, the surface inspection device 54 is accommodated inside the housing 56. Subsequently, the underwater remote surface inspection apparatus 1A is lifted up by the fuel exchanger 43 so as to be taken out from the inside of the reactor core shroud 51 and the inside of the reactor pressure vessel 50. The underwater remote surface inspection apparatus 1A is lifted up to a position above the operation floor 42 through the reactor well 41.

The hardened replica agent is extracted from the replica picking head 7 of the lifted underwater remote surface inspection apparatus 1A, and the observation in Step S9 is performed.

In this embodiment, it is possible to obtain the advantages excluding the advantages obtained by the manipulation pole 24 and the fixing device 25 among the advantages in the first embodiment. In this embodiment, since it is possible to press the replica picking head 7 against the reactor core shroud 51 by using the support arms 60A and 60B instead of the fixing device 25, it is possible to more reduce a time required for the pressing operation than a time required for the operation of pressing the replica picking head 7 by using the fixing device 25 in Step S4 in the first embodiment. Since it is not necessary to perform the operation of moving the fixing device 25 by using the manipulation pole and the operation of moving the surface inspection device 54 by using the manipulation pole 24, it is possible to reduce a burden of the operator.

Even in this embodiment, when it is found that the solid materials such as the clad materials are not adhered to the inner surface of the reactor core shroud, after the operation in Step S2 ends, the operation in Step S4 may start instead of performing the operation of removing the solid materials such as the clad materials in Step S3.

Even in this embodiment, when it is found that the unevenness in the inner surface of the reactor core shroud is large and a large amount of the gas bubbles and the liquid bubbles remain during the replica agent injecting operation, the ultrasonic wave may be transmitted from the ultrasonic vibration plate 12 into the replica agent supply region 38 during a time when the replica agent is supplied into the replica agent supply region 38.

This embodiment may be used to inspect the shape of the inner surface of the nozzle formed in the reactor pressure vessel of the boiling water reactor, the shape of the surface of the core internal structure as the reactor constituting member of the pressurized water reactor, and the shape of the inner surface of the nozzle thereof.

Third Embodiment

Figure 7A:
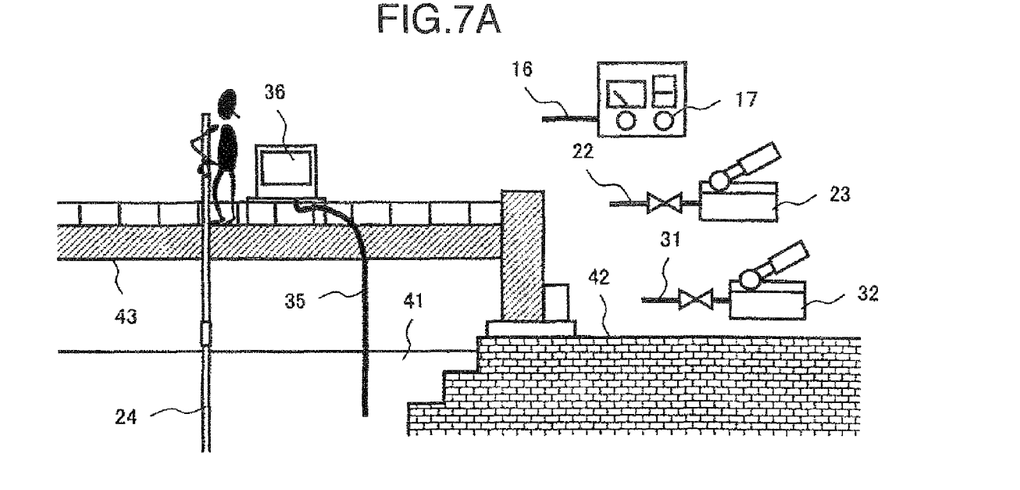
FIGS. 7A and 7B are diagrams illustrating a configuration of the underwater remote surface inspection apparatus for the reactor constituting member according to the second embodiment of the invention.
Figure 7B:
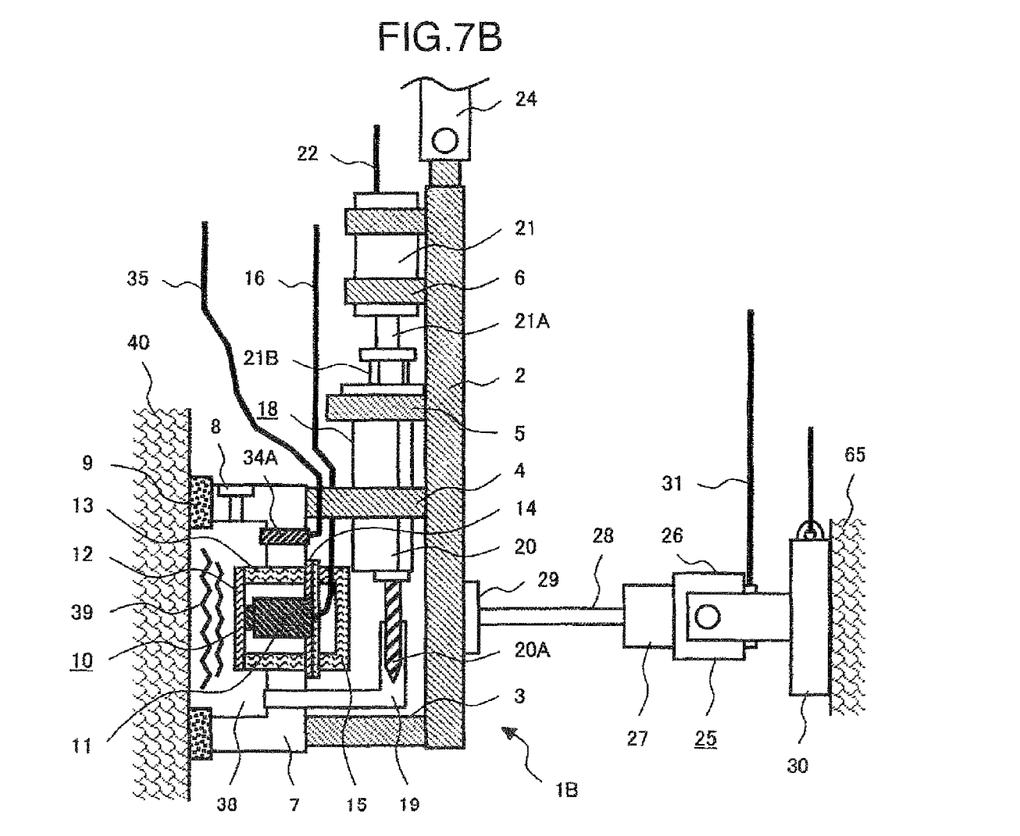

An underwater remote surface inspection apparatus for a reactor constituting member according to a third embodiment as another embodiment of the invention will be described with reference to FIGS. 7A and 7B. An underwater remote surface inspection apparatus 1B according to this embodiment has a configuration in which the underwater camera 34 of the underwater remote surface inspection apparatus 1 according to the first embodiment is changed to an image photographing device 34A, and the image photographing device 34A is attached to the replica picking head 7. The image photographing device 34A includes a camera and an illumination unit. The camera is connected to the television monitor 36 through the cable 35. The illumination unit is connected to a power source through another cable. When the camera is configured as a remote focus camera using a liquid lens and the illumination unit is configured as a light emitting diode, it is possible to decrease the size of the image photographing device 34A and to reduce the heat emission amount thereof. The other configurations of the underwater remote surface inspection apparatus 1B are the same as those of the underwater remote surface inspection apparatus 1.

Even in the underwater remote surface inspection method for the reactor constituting member performed on the boiling water reactor by using the underwater remote surface inspection apparatus 1B, the processes in Step S1 to Step S9 illustrated in FIG. 2 are performed. In this embodiment, since the replica picking head 7 is provided with the image photographing device 34A, it is possible to directly observe the surface state of the inspection region of the inner surface of the reactor core shroud, pressed by the replica picking head 7, by using the camera. Since it is possible to easily check the state of the solid materials such as the clad materials adhered to the inner surface, it is easy to determine whether the process in Step S3 is performed. In addition, it is possible to improve the precision in the operation of positioning the replica picking head 7 to the inspection region of the inner surface of the reactor core shroud by using the image photographing device 34A disposed in the replica picking head 7. Since it is possible to photograph the state of the replica agent filled into the replica agent supply region 38 by using the camera of the image photographing device 34A upon supplying the replica agent into the replica agent supply region 38 of the replica picking head 7 pressed against the inner surface of the reactor core shroud, it is possible to check the filling state of the replica agent on the basis of the obtained image. Accordingly, it is possible to reduce an error in the operation of transferring the surface shape of the inspection region to the replica agent due to the insufficient filling state of the replica agent inside the replica agent supply region 38. As a result, since it is possible to improve the precision in the operation of picking the replica, it is possible to decrease the number of the repetitive operations of extracting the replica of the inspection target.

In this embodiment, it is possible to obtain the advantages according to the first embodiment.

In the same manner as the first embodiment, even in this embodiment, when it is found that the solid materials such as the clad materials are not adhered to the inner surface of the reactor core shroud, it is not necessary to perform the operation of removing the solid materials such as the clad materials in Step S3. In addition, this embodiment may be used to inspect the shape of the surface of other reactor constituting members such as the nozzle formed in the reactor pressure vessel of the boiling water reactor, or the shape of the surface of the reactor constituting member of the pressurized water reactor.

Even in this embodiment, when it is found that the unevenness on the surface of the reactor core shroud is large and a large amount of the gas bubbles and the liquid bubbles remain during the replica agent injecting operation, the ultrasonic wave may be transmitted from the ultrasonic vibration plate 12 into the replica agent supply region 38 during a time when the replica agent is supplied into the replica agent supply region 38.

The underwater remote surface inspection apparatus according to the invention may be used to inspect the surface state of the reactor constituting member in the nuclear power plant, that is, the surface state of the reactor constituting member in the reactor pressure vessel.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An underwater remote surface inspection method for a reactor constituting member comprising the steps of:
   carrying a replica picking head having a replica agent supply region provided with an opening, into a reactor vessel filled with water;

pressing said replica picking head against a surface of a reactor constituting member in a state where said opening faces the surface of the reactor constituting member disposed in said reactor vessel;

allowing a replica agent to contact with the surface of said reactor constituting member by supplying said replica agent into said replica agent supply region inside said pressed replica picking head; and applying an ultrasonic wave to the replica agent inside said replica picking head, wherein a frequency of said ultrasonic wave applied to said replica agent is modulated, and wherein the frequency of said ultrasonic wave applied to said replica agent is modulated during the applying thereof.

2. An underwater remote surface inspection method for a reactor constituting member comprising the steps of:

carrying a replica picking head, having an ultrasonic vibration plate contacting with an ultrasonic vibrator, connected to a replica agent supply device, and having a replica agent supply region provided with an opening, into a reactor vessel filled with water;

pressing said replica picking head against a surface of a reactor constituting member in a state where said opening faces said surface of said reactor constituting member disposed in the reactor vessel;

allowing a replica agent to contact with said surface of said reactor constituting member by supplying said replica agent from said replica agent supply device into said replica agent supply region inside said pressed replica picking head; and transmitting an ultrasonic wave from said ultrasonic vibration plate to said replica agent inside said replica picking head, wherein a frequency of said ultrasonic wave applied to said replica agent is modulated, and wherein the frequency of said ultrasonic wave applied to said replica agent is modulated during the transmitting thereof.

3. An underwater remote surface inspection method for a reactor constituting member comprising the steps of:

disposing an underwater remote surface inspection apparatus inside a reactor vessel filled with water so that a second opening faces a surface of a reactor constituting member disposed in the reactor vessel, said underwater remote surface inspection apparatus including a replica picking head having an ultrasonic vibration plate contacting with an ultrasonic vibrator, connected to a replica agent supply device, and having a replica agent supply region provided with a first opening, a moving device moving said replica picking head, and an elongate housing attached with the moving device, accommodating the replica picking head, and having said second opening extending in an axial direction;

moving said replica picking head up to a position of an inspection region of said reactor constituting member along said housing by using said moving device;

pressing said replica picking head moved up to the position of said inspection region against a surface of said reactor constituting member in a state where said replica picking head is allowed to protrude from said second opening by said moving device and said first opening faces the surface of said reactor constituting member;

allowing a replica agent to contact with the surface of said reactor constituting member by supplying the replica agent from said replica agent supply device into said replica agent supply region inside said pressed replica picking head; and transmitting an ultrasonic wave from said ultrasonic vibration plate to said replica agent inside said replica picking head, wherein a frequency of said ultrasonic wave applied to said replica agent is modulated, and wherein the frequency of said ultrasonic wave applied to said replica agent is modulated during the transmitting thereof.

* * * * *